UNITED STATES PATENT OFFICE.

WILLIAM J. SHARWOOD, OF BERKELEY, CALIFORNIA, ASSIGNOR OF ONE-HALF TO CHARLES W. MERRILL, OF LEAD, SOUTH DAKOTA.

ART OF PRECIPITATING METALS FROM CYANID SOLUTIONS.

No. 832,880.      Specification of Letters Patent.      Patented Oct. 9, 1906.

Application filed February 24, 1904. Serial No. 195,124.

*To all whom it may concern:*

Be it known that I, WILLIAM J. SHARWOOD, a citizen of the United States, residing at Berkeley, in the county of Alameda and State of California, have invented an Improvement in the Art of Precipitating Metals from Cyanid Solutions, of which the following is a specification.

My invention relates to an improvement in processes for extracting precious metals from cyanid solutions, and particularly solutions containing double cyanids of gold and silver.

In the conduct of the cyanid process of ore treatment the solutions obtained, containing the double cyanid of gold or silver or of gold and silver with one or more of the alkali metals, are almost invariably alkaline in reaction, and the precipitation of precious metal from them has generally been effected by bringing them into contact with metallic zinc in a stage of fine division, though electrical and other methods have been used to some extent. Under these conditions considerable amounts of zinc are of necessity taken into solution, and the zinc accumulates to a considerable extent in solutions which have been long in use. In the case of solutions weak in cyanid the precipitation of precious metal is usually imperfect, frequently making it necessary either to add cyanid in order to make precipitation more nearly complete or to sacrifice a portion of the dissolved values. Moreover, any copper when present in the solution largely fails to precipitate, thereby accumulating in the solutions and rendering inert a considerable amount of cyanogen. Now I have discovered that where the solutions are first made neutral and then brought into contact with the zinc in a fine state of division that the amount of zinc dissolved by the solution during the act of precipitation is greatly reduced and the precipitation of gold, silver, and copper, or of any of these metals which may occur in the solution, more perfect. In this manner the addition of an excess of acid is avoided thereby diminishing the cost and reducing the quantity of zinc passing into solution, as any excess of either acid or alkali increases the quantity of zinc dissolved.

To carry this improvement into effect, I allow the solution containing the double cyanid of the precious metal to accumulate in a suitable vat. I then agitate or stir it and add a suitable acid or acid salt in such quantity as to neutralize the solution, so that it no longer reacts alkaline toward a suitable indicator, such as phenol-phthalein. It is then brought into contact with metallic zinc, either by agitating it with or causing it to flow through or over a quantity of metallic zinc or an alloy of zinc in a state of fine division. The gold, silver, and copper or such of these metals as are present are thereby precipitated and can be recovered and separated from any undissolved zinc by well-known means.

For the purpose of neutralization it is convenient to use either commercial sulfuric acid or acid sodium sulfate, this latter being a cheap salt formed as a by-product in various chemical manufactures. In order to facilitate precipitation of the precious metals from neutral solutions as well as from those which are alkaline, the solution may be heated or the zinc dipped first into solutions of certain salts of other metals.

On neutralizing in the manner described the cyanid solutions obtained in metallurgical practice a precipitate is frequently formed at once which may contain precious metal or copper. Such a precipitate may either be separated from the solution by decantation or filtration before bringing the solution and zinc together or it may be allowed to remain and mix with the precipitate produced by the zinc.

After the precipitation and separation of the precipitate and undissolved zinc the cyanid solution can be regenerated by addition of caustic alkali. This not only reforms any free alkaline cyanid which originally existed in the solution, but also renders available much of the cyanogen which was previously held in combination as double cyanid of copper.

I am aware that neutral cyanid solutions have been treated by means of zinc in order to precipitate the precious metals contained in them; but I believe it to be new to first render alkaline solutions as nearly as possible neutral and then to effect precipitation by means of material containing zinc in a fine state of division.

I claim as my invention—

1. The process of extracting metals from cyanid solutions, which consists in neutralizing said solutions and then bringing them into contact with a material containing a more electropositive metal in a fine state of division whereby the metals are precipitated.

2. The process of extracting metals from cyanid solutions, which consists in neutralizing said solutions by the addition of a suitable acid containing material in proper proportions, and then bringing such solutions into contact with a material containing a more electropositive metal in a fine state of division whereby the metals are precipitated.

3. The process of extracting precious metals and copper from cyanid solutions, which consists in neutralizing said solutions, and then bringing them into contact with material containing metallic zinc in a state of fine division, while said solutions are neutral in reaction, whereby the precious metals and copper are precipitated.

4. The process of extracting precious metals and copper from alkaline double-cyanid solutions, which consists in rendering said solutions neutral by the addition of a suitable acid-containing material, in proper proportions, and then bringing said solutions into contact with material containing metallic zinc in a state of fine division whereby the precious metals and copper are precipitated.

5. The process of extracting precious metals and copper from cyanid solutions, which consists in neutralizing said solutions and then bringing them into contact with an alloy of zinc, in a state of fine division, while said solutions are neutral in reaction whereby the precious metals and copper are precipitated.

6. The process of extracting precious metals and copper from alkaline cyanid solutions, which consist in rendering said solutions neutral by the addition of a suitable acid-containing material, in proper proportions, and then bringing said solutions into contact with an alloy of zinc, in a state of fine division, whereby the precious metals and copper are precipitated.

WM. J. SHARWOOD.

Witnesses:
  EDMUND O'NEILL,
  W. C. BLASDALE.